Jan. 11, 1966　　　F. S. SAMPSON　　　3,228,280

FASTENING DEVICE WITH EXPANSIBLE ATTACHING PORTION

Filed April 10, 1963

Inventor:
Fredrick S. Sampson,
by Walter P. Jones
Att'y.

United States Patent Office 3,228,280
Patented Jan. 11, 1966

3,228,280
FASTENING DEVICE WITH EXPANSIBLE
ATTACHING PORTION
Frederick S. Sampson, Saugus, Mass., assignor to United-Carr Incorporated, a corporation of Delaware
Filed Apr. 10, 1963, Ser. No. 271,953
1 Claim. (Cl. 85—82)

This invention is directed to an improved fastening device that may be in the nature of a rivet for securing two or more parts in assembly and/or it may also include as a part of a fastener any other well-known construction such, for example, as fastening means for holding a molding to a support, a wiring clip, etc.

An object of the invention is to provide a new, simple, inexpensive and easily operable rivet portion as a part of any suitable fastening device to be attached in an aperture in a support and is particularly useful in so-called "blind" applications.

A further object of the invention is to provide a fastening attaching means that includes, as an integral part of the device, a pair of opposed movable attaching fingers joined by connecting portions that may be moved relative to each other, and that are so shaped that, when they are moved, as by squeezing with pliers, become elongated and move the fingers away from each other to rivet the fastener to a support.

It is known that fasteners with attaching portions operable by pliers or other tools are now old in the art and an assembly of what is known is disclosed by United States Patent to D. H. Waara No. 2,460,722, issued February 1, 1949 and United States Patent to R. H. Holton, No. 2,875,487, issued March 3, 1959. However, the present invention is an improvement over the known art because of the construction thereof, simplicity, and positive holding power.

In the particular fastening device selected for illustration by the drawings, a one piece rivet is shown. This rivet includes a base flange 1 from which is drawn a tubular portion 2. The tubular portion 2 has an annular wall 3 and a bottom 4 so that, in the initial stages of forming the devices from sheet metal, it is cup-shaped. Thereafter suitable tools form slots 5—5 in opposite sides of the wall 3 to provide a pair of opposed movable attaching fingers 6—6. To complete the device the manufacturing tools form a pair of finger connecting portions 7—7 from the material of the bottom 4 by suitable drawing and cutting operations, as will be understood by anyone skilled in the metal forming art.

Figure 6:
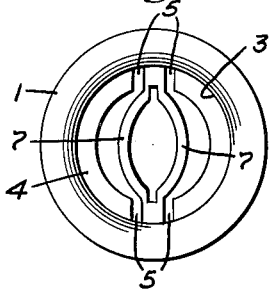
FIG. 6 is an enlarged plan view of one form of the fastener device.
Figure 7:
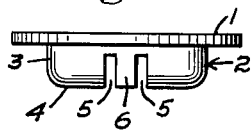
FIG 7 is an edge view of the device shown in FIG. 6.

It should be noted that the connecting portions 7—7 are joined to the fingers 6—6 and that they are located within the tubular portion 2 and are normally bowed outwardly relative to each other, as shown in FIG. 6. It should be noted that the connecting portions 7—7 are formed with substantial widths so that they are strong enough to be flattened toward each other and maintain their positions as will be described hereinafter.

Figure 1:
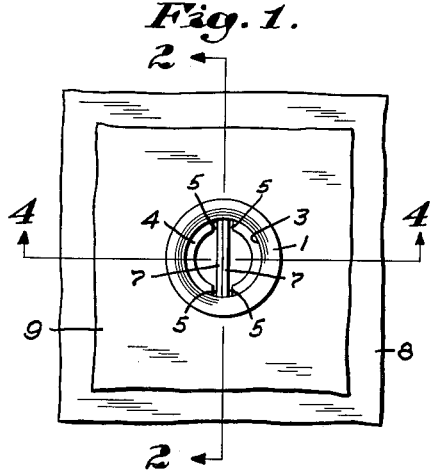
FIG. 1 is a plan view of the device as used in an installation to secure together two plate members.
Figure 2:
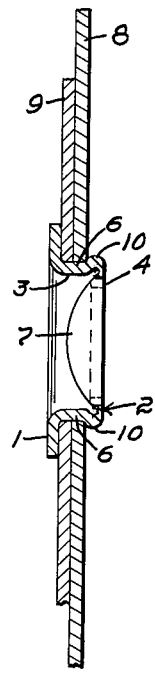
FIG. 2 is an enlarged section taken on the line 2—2 of FIG. 1.
Figure 3:
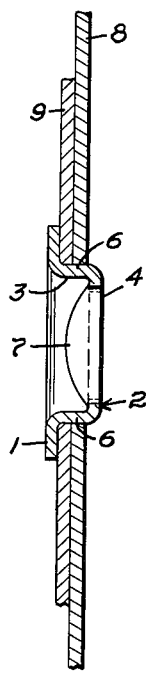
FIG. 3 is a view similar to FIG. 2 showing the riveting means as it would appear before being riveted.
Figure 4:
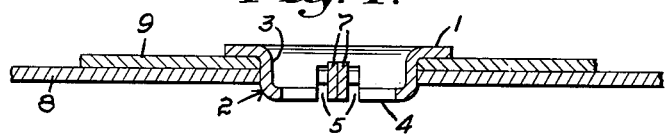
FIG. 4 is a section taken on the line 4—4 of FIG. 1.
Figure 5:
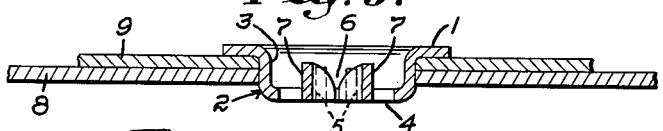
FIG. 5 is a section similar to FIG. 4 showing the device prior to the riveting operation.

The particular rivet illustrated in the drawings is shown as securing together two plate-like members 8 and 9 having aligned apertures formed therethrough. In the first place the rivet is applied so that the tubular portion 2 passes into and through the apertures at the plates 8 and 9 with the flange 1 resting against the plate 9, as shown in FIGS. 3 and 5. Thereafter the attachment is easily completed by using pliers which span the finger connecting portions 7—7 and are squeezed so that the portions 7—7 are brought together as shown in FIG. 4. Since the connecting portions 7—7 are bowed outwardly relative to each other, as shown in FIG. 6, they will become flattened, as shown in FIG. 1, and thus elongated, thereby forcing portions 10—10 of the bottom 4 and fingers 6—6 outwardly to overlie the inner face of the plate-like member 8, as best shown in FIG. 2. Since the finger connecting portions 7—7 take a relatively permanent flat set against each other they maintain the portions 10—10 in their expanded positions and thus the plate members 8 and 9 are held in a strong, tight assembly. The same will be true of holding a molding fastener, wiring clip, etc. to a support when the invention is to be used in connection with that type of fastener.

While there has been illustrated and described a particular fastener with a specific form of the invention it should be understood that the invention is best defined by the following claim.

I claim:

A sheet metal fastening device having a tubular attaching portion for entrance into an aperture in a support and having an enlarged means at the rear end thereof, said attaching portion having two pairs of diametrically opposed, longitudinal slots at the forward end thereof providing a pair of spring fingers in spaced opposed relationship, and a pair of connecting, movable members extending transversely across the area defined by said attaching portion from one of said spring fingers to the other, and being integrally connected thereto, said connecting members comprising a pair of substantially flat, axially extending portions being radially outwardly bowed in relatively opposite directions, wherein said connecting members will become elongated upon squeezing said members together, thereby flexing the spring fingers outwardly, said connecting members being located at the said tubular portion and being spaced therefrom for substantially their entire length.

References Cited by the Examiner
UNITED STATES PATENTS

| | | | |
|---|---|---|---|
| 1,742,044 | 12/1929 | Meldrum | 85—40 |
| 2,398,532 | 4/1946 | Keehn | 24—208 |
| 2,527,227 | 10/1950 | Namet | 85—40 |
| 2,591,575 | 4/1952 | McCollum | 85—83 |
| 2,875,487 | 3/1959 | Holton | 24—73 |

CARL W. TOMLIN, *Primary Examiner.*

EDWARD C. ALLEN, *Examiner.*